(12) United States Patent
Fenile et al.

(10) Patent No.: US 9,499,345 B2
(45) Date of Patent: Nov. 22, 2016

(54) PACING DEVICE FOR GRAVITY CONVEYORS

(71) Applicant: Ferag AG, Hinwil (CH)

(72) Inventors: Roberto Fenile, Wetzikon (CH); Simon Guhl, Wetzikon (CH)

(73) Assignee: FERAG AG, Hinwil (CH)

( * ) Notice: Subject to any disclaimer, the term of this patent is extended or adjusted under 35 U.S.C. 154(b) by 0 days.

(21) Appl. No.: 14/643,277

(22) Filed: Mar. 10, 2015

(65) Prior Publication Data

US 2015/0266677 A1 Sep. 24, 2015

(30) Foreign Application Priority Data

Mar. 20, 2014 (CH) ........................................ 0429/14

(51) Int. Cl.
| | | |
|---|---|---|
| *B65G 19/02* | (2006.01) | |
| *B65G 47/61* | (2006.01) | |
| *B65G 47/84* | (2006.01) | |
| *B65G 9/00* | (2006.01) | |

(52) U.S. Cl.
CPC ............ *B65G 19/025* (2013.01); *B65G 9/006* (2013.01); *B65G 47/61* (2013.01); *B65G 47/846* (2013.01)

(58) Field of Classification Search
CPC .... B65G 9/006; B65G 9/008; B65G 19/025; B65G 47/08; B65G 47/29; B65G 47/32; B65G 47/57; B65G 47/61; B65G 47/846
USPC ...... 198/459.2, 465.1, 465.4, 526, 530, 531, 198/562
See application file for complete search history.

(56) References Cited

U.S. PATENT DOCUMENTS

| | | | |
|---|---|---|---|
| 1,912,647 A | 6/1933 | Lemmon | |
| 2,679,810 A * | 6/1954 | Schutt | B65G 47/295 104/253 |
| 4,201,286 A | 5/1980 | Meier | |
| 4,694,951 A * | 9/1987 | Gibbemeyer | B29C 49/4215 198/429 |
| 5,103,737 A * | 4/1992 | Iwase | B65G 19/025 104/88.03 |
| 5,377,814 A * | 1/1995 | Smith | B07C 5/3412 198/465.4 |
| 6,264,415 B1 * | 7/2001 | Boochakorn | H05K 13/0434 193/40 |
| 6,742,648 B2 * | 6/2004 | Honegger | B65G 19/025 198/687.1 |
| 6,968,937 B2 * | 11/2005 | Mader | B65H 29/003 198/419.1 |
| 8,672,118 B2 * | 3/2014 | Janzen | B65G 47/61 198/678.1 |
| 2015/0239671 A1 * | 8/2015 | Wend | B61B 10/025 198/347.1 |

FOREIGN PATENT DOCUMENTS

| | | |
|---|---|---|
| CH | 618 398 | 7/1980 |
| DE | 10 2010 045 725 | 3/2012 |

(Continued)

*Primary Examiner* — Gene Crawford
*Assistant Examiner* — Keith R Campbell
(74) *Attorney, Agent, or Firm* — Rankin, Hill & Clark LLP

(57) ABSTRACT

A pacing device for a transfer of individual vehicles of a gravity conveyor onto a conveying device of the gravity conveyor that conveys in a paced manner. Thereby, the pacing device is designed such that the individual vehicles can be assigned to a pace of the conveying device and that the pacing device includes a damping mechanism that gently weakens an impulse of an individual vehicle moving in the direction of the pacing device, the impulse acting upon the pacing device. The pacing device can include a release on which the damping mechanism is formed. The damping mechanism in particular can be designed as an arm with an elastic part-region.

13 Claims, 6 Drawing Sheets

(56) References Cited

FOREIGN PATENT DOCUMENTS

| | | |
|---|---|---|
| DE | 10 2011 056 101 | 2/2013 |
| EP | 0 145 525 | 6/1985 |
| EP | 0 517 342 | 12/1992 |
| EP | 1 299 298 | 4/2004 |
| JP | 6-127645 | 5/1994 |
| WO | 99/33731 | 7/1999 |

* cited by examiner

Section A-A

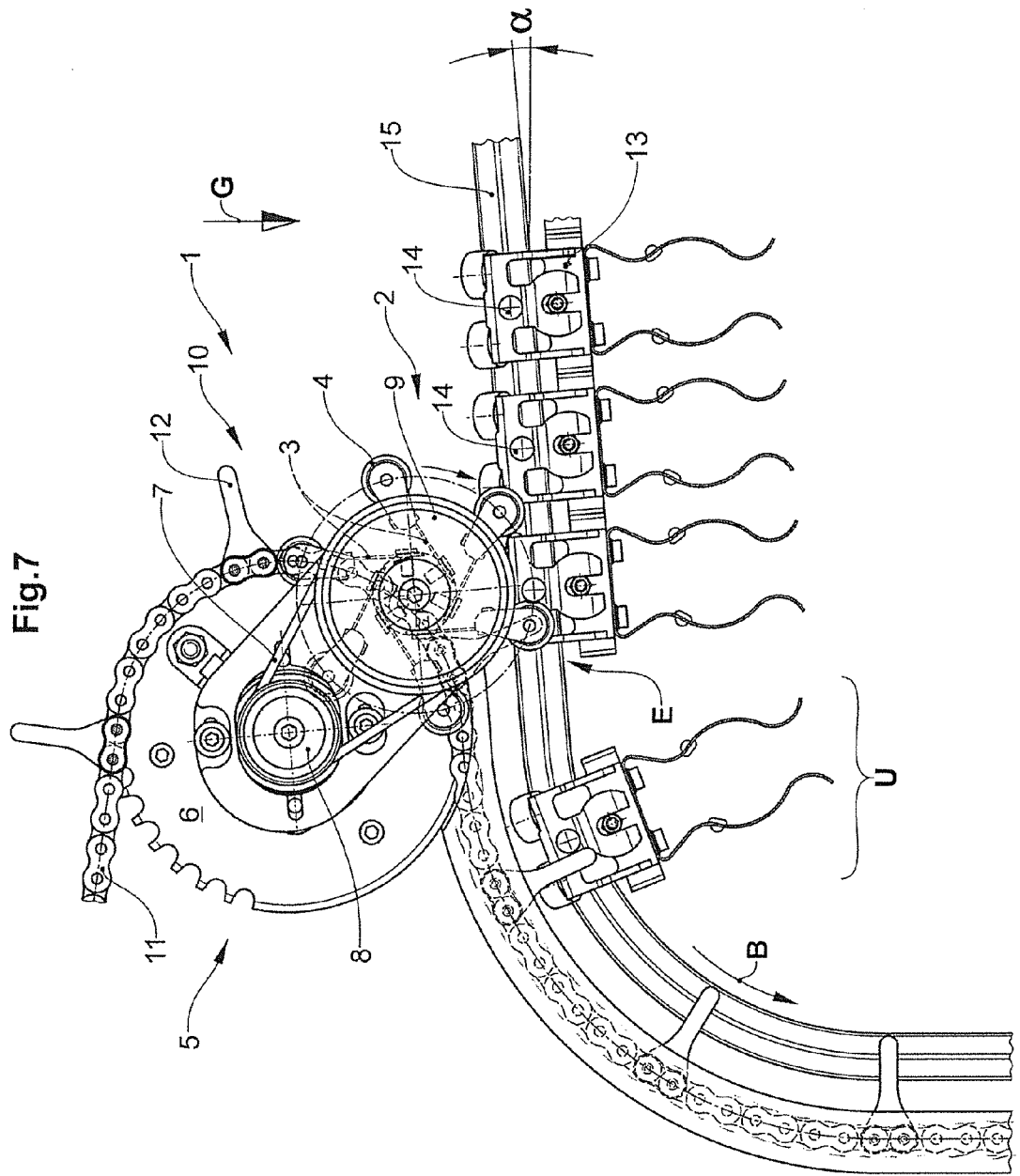

PACING DEVICE FOR GRAVITY CONVEYORS

BACKGROUND OF THE INVENTION

Field of the Invention

The invention relates to pacing devices for gravity conveyors and, more particularly, toward a release for the pacing device and to a method for pacing individual vehicles of a gravity conveyor into a conveying means of the gravity conveyor that conveys in a paced manner.

Description of Related Art

A gravity conveyor is a conveyor that conveys objects mainly by way of gravitational force. The gravity conveyor thereby can include individual vehicles that move on the gravity conveyor free of connections amongst one another and convey objects. Individual vehicles of the gravity conveyor are thus mainly driven by gravitation (thus gravitational force). The individual vehicles are designed in a manner such that they are capable of conveying objects. An object that is conveyed by an individual vehicle can be understood as a conveying unit which is composed of an individual object or of several individual objects. The term "object" in the context of conveying by way of individual vehicles, includes the complete conveyed goods that are conveyed by an individual vehicle.

With a gravity conveyor, a conveying means can convey the individual vehicles on part-stretches. Thereby, the conveying means can move the individual vehicles in a direction with a component counter, which is to say opposite to the gravitational direction. Or the conveying means can move the individual vehicles in a direction with a component in the gravitational direction. Or the conveying means can move the individual vehicles in a direction without a component in or counter to the gravitational direction (thus, horizontally).

The conveying means, for example, can convey the individual vehicles in a changing direction. Thereby, optionally differently large components of the direction in and/or counter to the gravitational direction can be included or not.

The conveying means can optionally convey the individual vehicles partly counter to the gravitational direction. This, for example, can serve for transporting the individual vehicles to a defined height (thus, a defined distance to the ground, measured in the gravitational direction), wherein this height can be used for a conveying by way of gravitation and/or can ensure a certain spatial position of the individual vehicles, for example for a transfer of the conveyed objects. The conveying means thereby, in particular, engages onto the individual vehicle at least partly from below. Engaging "from below" is meant as engaging in a direction counter to the gravitational direction. Thus, the individual vehicle can lie on the conveying means and be moved and driven by the conveying means.

The conveying means can optionally convey the individual vehicles at least partly in the gravitational direction. This, for example, can serve for pacing the individual vehicles, although these could be driven at a higher speed in the gravitational direction by way of gravitation. In this manner, it is possible to control how many individual vehicles at which time and at which speed move through a certain section of the gravity conveyor. The conveying means thereby engages onto the individual vehicle at least partly from below. The individual vehicle can thus lie on the conveying means and be braked by the conveying means.

Individual vehicles of the gravity conveyor can thereby be transferred by way of pacing devices for example, to conveying means that convey the individual vehicles, for example, in a paced manner.

Such a pacing device is known for example from EP 1 299 298 B1. There, buffer stores are described, whose holding elements (or individual vehicles) are not released from the buffer store and transferred to a conveying-away drive (or conveying means) individually, but in groups. For this, means are described for forming holding element groups in the buffer store and means for releasing holding-element groups from the buffer store, wherein these means can be designed as one or also as two device parts. These means are disclosed in EP 1 299 298 B1 as pacing wheels as well as device parts that are designed separately from one another and are separately controllable.

The release means disclosed in the state of the art, such as pacing wheels or device parts have the disadvantage that the individual vehicles abruptly transmit their impulse onto the release means or onto the end of the buffer store, on running onto the release means or onto an end of the buffer store. The individual vehicles are thus abruptly braked. Such a sudden braking can be disadvantageous for the individual vehicles, for the objects conveyed with the individual vehicles, for a fastening mechanism of the conveyed objects on the individual vehicle, for the release means and/or for device parts of the pacing device or of the gravity conveyor connected thereto.

The abrupt impulse transmission can lead to material fatigue, for example. A greater wear can also result from this. A high noise formation can also be caused. The conveyed objects in the individual vehicles can become damaged. The conveyed objects can be dislocated—relative to the individual vehicles and/or relative to one another in the case of objects with several individual parts. In particular, the conveying means (and thereby in particular its driver devices for the individual vehicles and/or its drive) can also become damaged, adversely affected and/or worn.

SUMMARY OF THE INVENTION

It is therefore an object of the invention, to create a pacing device of the initially mentioned type, which at least partly overcomes at least one of the disadvantages mentioned above.

With the pacing device according to the invention, for a transfer of individual vehicles of a gravity conveyor onto conveying means of the gravity conveyor that conveys in a paced manner, the pacing device is designed such that the individual vehicles can be assigned to a pace (cycle) of the conveying means. The pacing device thereby includes a damping mechanism that gently weakens an impulse of an individual vehicle that acts upon the pacing device.

The transfer of the individual vehicle by the pacing device onto the conveying means conveying in a paced manner is effected between a region of a movement path of the gravity conveyor with a free movement of the individual vehicles and a region of a movement path of the gravity conveyor with a conveying of the individual vehicle by the conveying means conveying in a paced manner.

The individual vehicle effects an impulse upon the pacing device, in the case that the individual vehicle finds itself outside a pace of the conveying means, which is assigned to it. The individual vehicle, for example, can find itself outside the pace of the conveying means that is assigned to it, for example, if it has non-matching space-time coordinates and/or a non-matching impulse. As a result of this, it is not possible for the individual vehicle, on hitting the conveying means, at once to assume a pace of the conveying means that is assigned to it, if no pacing device is present. The individual conveyor can also run through the pacing device without exerting an impulse upon the pacing device, in a case in which the individual vehicle already finds itself in the pace of the conveying means that is assigned to it. Such a run-through or passage can thus also be effected without an impulse acting upon the pacing device, by way of which the impulse of the individual vehicle is thus also not weakened.

The individual vehicles can be freed of excess kinetic energy in a gentle manner by way of the pacing device, before the transfer to the conveying means. For this, the impulse of the individual vehicle can at least be partly absorbed by the pacing device, wherein this is effected in a gentle manner. The impulse of the individual vehicle is thus gently weakened in this manner. The impulse absorbed by the pacing device can be dissipated by the pacing device for example. Dissipating is to be understood as a dissipation in the physical sense, thus a conversion of movement energy into thermal energy. Thereby, for example, a part of the pacing device can be designed in an elastic or compliant manner, in order to effect a gentle weakening of the impulse.

A gentle weakening indicates a soft weakening. The weakening in other words is effected carefully and gently. An impulse of the individual vehicle that acts upon the pacing device is thereby temporally extended, in other words distributed over a time duration. Peak values of force effects upon the elements participating in the impulse transmission can thus be avoided. The gentle weakening is in contrast to a rapid, abrupt, sudden or jerky weakening, with which the individual vehicles are slowed down in a short time and with a high peak value of impulse transmission over time. A rebounding of individual vehicle on the pacing device and/or at other individual vehicles, for example, can be reduced or avoided by way of the gentle weakening.

A gentle weakening in particular can be understood in that an impulse is weakened in an extended manner over a time period of at least 0.05 seconds. In particular, this time period can also be at least 0.1 seconds. This time period in particular is also at least 0.4 seconds.

The gentle weakening can be material-friendly with regard to individual vehicles, to the objects conveyed therewith, to the pacing device, to the gravity conveyor and/or to the conveying means conveying in a paced manner. The gentle weakening thus reduces material fatigue on the mentioned parts of the device. The wear of the mentioned parts can also be reduced by the gentle weakening. Damage to the mentioned parts can be reduced or prevented. The objects that are conveyed by the individual vehicles are thus dislocated to a lesser extent or even not at all (relative to the individual vehicle and/or relative to one another in the case of objects with several individual parts).

The gentle weakening in particular can fashion a running of new individual vehicles onto a buffer store in a manner that is material-friendly and less of a burden on the material, by way of the impulse of the new rearmost individual vehicle being transferred further by the buffer store onto the frontmost individual vehicle, which has a contact fit with the pacing device, and by way of which its impulse is gently weakened. The conveying means or its driver (catch) device for the individual vehicles and in particular the drive of the conveying means are treated gently due to the gentle weakening, by way of no undesired, excessive impulse and/or impulse acting outside the pace acting upon these. The gentle weakening of the impulse can moreover create a lower noise level of the pacing.

As an optional feature, the pacing device includes a release means that paces the individual vehicles into the conveying means by way of a contact fit with the individual vehicles, wherein the damping mechanism is formed on the release means.

The release means can create a contact fit with the individual vehicles, by way of which contact fit the impulse of an individual vehicle moving in the direction of the pacing device acts upon the release means and, thus, upon the pacing device. This contact fit and the damping mechanism formed on the release means gently weaken the impulse acting upon the release means.

With regard to the fact that the individual vehicle is paced into the conveying means, this in other words means that the individual vehicles are paced downstream of the pacer in the movement direction of the individual vehicles and thus assigned to individual paces of the conveying means conveying in a paced manner. The individual vehicles in contrast can, but do not need to be non-paced, upstream of the pacer in the movement direction of the individual vehicles.

A pacing device with release means can be designed in a mechanically simple and stable manner. The pacing device can be designed in a compact manner by way of the damping mechanism on the release means. The release means can include wearing parts and be suitable for a rapid and simple repair, maintenance and replacement. The contact fit with the release means permits an efficient and inexpensive manner of impulse transmission.

The damping mechanism of the pacing device can comprise an arm that is elastically designed at least in a part-region.

The damping mechanism can include an arm. Thereby, at least one part-region of the arm is elastic, or the complete arm is elastic. In particular, the arm has a shape elasticity. Arms that are elastic or comprise elastic regions are inexpensive, robust and have a long service life. Such arms can dissipate a part of the absorbed energy. Elastic arms or arms with elastic part-regions can be designed in a manner such that they can gently weaken an impulse acting thereupon from individual vehicles, by way of the impulse transmission being temporally extended due to the elasticity. The gentle weakening entails the corresponding advantages that are described further above.

In particular, the damping mechanism can include an arm including at least one part-region of spring-steel sheet. Thereby, the spring-steel sheet is designed in a manner such that the arm is elastically deformed by an impulse that acts from the individual vehicle upon the arm and thus upon the release means. Those advantages that have been described above also apply to this case. Moreover, part-regions of spring-steel sheet and, thus, the arms are inexpensively and simply manufacturable. The complete arm can also be formed from the spring-steel sheet.

The arms can also be designed without elastic regions. The damping mechanism can also be designed without arms.

As a further feature, the damping mechanism can include an elastic contact zone for a contact fit with the individual vehicles.

The elastic contact zone, for example, can be designed as a contact surface, contact point or contact line. The elastic contact zone can gently weaken the impulse acting upon the pacing device, by way of the impulse transmission being temporally extended by way of the elasticity. The elastic contact zone, for example, can be designed as a coating or as a pad-like coat. The elastic contact zone for example can also dissipate energy. The elastic contact zone can be designed in an exchangeable manner, in order to permit an inexpensive, simple and rapid repair or replacement.

In particular, the elastic contact zone can be designed as part of an O-ring. Thereby, an O-ring can be fastened on a part of the damping mechanism and exchanged, in a simple and rapid manner. O-rings in many various embodiments (varying for example in shape, thickness and/or material) can be inexpensively manufactured. An O-ring, for example, can be positioned in an annular groove, which is peripheral around a face side of a bush, wherein the bush is arranged at one end of an elastic region of an arm of a release means. A bush is a hollow cylinder, in particular with a circular cross section.

The damping mechanism can alternatively also be designed without an elastic contact zone.

The pacing device as an optional feature can also include a pivot, about which the release means is rotatably mounted. Thereby, the pivot in particular is arranged running through a mass centre point of the release means.

The release means can be controlled, regulated and/or driven in a simple and efficient manner via a pivot. The release means can be rotated in a uniform manner and with a small amount of drive energy about the pivot if the pivot runs through a mass centre point of the release means.

The release means can optionally have a wheel-like shape.

In particular, the release means can be designed in the manner of blade wheel or paddle wheel, wherein the blades or the arms include the damping mechanism.

A wheel-like shape has the advantage of a simple design. A wheel-like release means can moreover be simply and efficiently controlled, regulated and/or driven via a wheel axle or pivot. The release means however can also be designed in a shape that differs from a wheel. The release means, for example, can be designed in a spherical, annular or cuboid manner, or as a rotation ellipsoid.

The pacing device as a further optional feature can include a singularising means that effects a singularisation of the individual vehicles on pacing into the conveying means.

A singularising means permits a reliable and efficient singularisation of the individual vehicles. Singularising means that consecutive individual vehicles are released separately from one another out of the pacing device. In this manner, it can, for example, be ensured that in each case maximally one individual vehicle is assigned to a pace of the conveying means conveying in paced manner. The pacing device however can also be designed without singularising means.

The singularising means in particular can include the release means.

The release means and its different embodiments described above can thereby be applied for singularising individual vehicles and thus as a singularising means. Using the release means as a singularising means simplifies the pacing device and permits a compact construction manner.

The singularising means, however, can also alternatively be designed separately from the release means.

A further aspect of the invention is a gravity conveyor that includes a pacing device as described above and a conveying means, wherein the pacing device includes a drive mechanism.

A mechanism that permits a drive of the pacing device is indicated as a drive mechanism. The pacing device can be driven and/or controlled by a drive mechanism. This permits a comprehensive and flexible application of the pacing device.

The pacing device can also be designed without a drive mechanism. The pacing device, for example, can be passively operated, for instance moved only by impulses of the individual vehicles, which act directly upon the pacing device.

The drive mechanism in particular can be driven by the conveying means, in a gravity conveyor.

The pacing device can be driven by a drive mechanism, which is driven by the conveying means. One can make do without a separate drive for the pacing device by way of this, which is inexpensive and saves space.

The pacing device can alternatively have an own drive and a drive mechanism, or the drive mechanism can be driven by a drive, which is independent of the conveying means.

The drive mechanism of the pacing device in particular can rigidly couple the release means onto the conveying means.

The rigid coupling is thereby indicated as a coupling with a fixed transmission ratio, or in other words a forced coupling. The conveying means and the drive mechanism of the release means are thus rigidly connected to one another, by which means the pacing device is also rigidly connected to the conveying means or rigidly coupled thereto.

In the case of a rigid coupling of the pacing device onto the release means, the pacing device can be designed in a simple and compact manner and simultaneously be driven as well as controlled in a robust and simple manner. The pacing device can thus be constructed inexpensively and in space-saving manner. The pacing device is robust and has a long service life. The repair, maintenance and overhauling of such a pacing device can be implemented in a simple, rapid and inexpensive manner.

As an alternative, the drive mechanism of the pacing device can also be connected to the conveying means via a variable coupling, for example by a coupling, in particular a clutch, a switchable clutch and/or freewheel.

The drive mechanism of the pacing device in particular can include a conveying means wheel for a non-positive contact with the conveying means, a toothed belt for driving the pacing device and a fixed transmission between the conveying means wheel and the toothed belt. A movement of the conveying means can be taken over and transmitted onto the pacing device by way of the conveying means wheel. The pacing device is thus driven by the conveying means and is rigidly coupled thereto. This embodiment of a drive mechanism is simple, robust and wear-resistant. Moreover, such a drive mechanism can be designed in a compact and inexpensive manner.

Optionally, in a gravity conveyor, the pacing device is designed and positioned in a manner such that a release position is arranged above a transfer location to the conveying means, relative to the gravitational direction. Thereby, the release position indicates a spatial position of the individual vehicles, in which the last possible contact fit between the individual vehicle and the pacing device can be effected, when the individual vehicle passes the pacing device in the movement direction of the individual vehicles.

The transfer location thereby indicates a spatial position of the individual vehicles, in which an individual vehicle can be taken over by the conveying means conveying in a paced manner. In other words, the individual vehicle at the transfer location can be driven or caught by the conveying means conveying in a paced manner, and conveyed.

If the transfer location of the individual vehicles to the conveying means is arranged below the release position in the gravitational direction, then the individual vehicle can be conveyed to the transfer location by way of gravitation after passing the release position. This, for example, provides the advantage that the individual vehicle comes into a contact fit with the pacing device and with the conveying means in a temporally and spatially separate manner. An individual vehicle can not be simultaneously in a contact fit with the pacing device and the conveying means, by which means a mutual clamping or jamming is avoided. The individual vehicle at a distance between the release position and transfer location can be accelerated by gravitation to a speed that permits a contact fit of the individual vehicle with the conveying means with a low impulse transmission onto the conveying means, as a further advantage.

Alternatively, the transfer location and release position can, however, also at least party overlap.

Optionally, a gravity conveyor includes a pacing device as described above, and conveying means, wherein the conveying means has a chain with drivers (catches).

A chain with drivers is an inexpensive and robust embodiment of a conveying means that is suitable for a paced conveying. If the drivers are coupled onto the chain in a rigid manner at a uniform distance, then a uniform pull movement of the chain permits a paced conveying, since chain links of chain retain their respective distance given a tensile or pull loading.

The gravity conveyor can, however, also include conveying means other than a chain with drivers and that are used as a conveying means conveying in a paced manner, for the individual vehicles. Conveying belts, cables (wire cables, plastic fibre cables or others) or plate conveyors or imbricate conveyors can be used, for example, in each case with or without drivers.

In particular, the gravity conveyor can include a sensor for individual vehicles and a sensor for the conveying means.

The sensors can be designed as optical, inductive, mechanical and/or magnetic sensors.

The gravity conveyor is capable of detecting a conveyed quantity of the conveying means and/or of the gravity conveyor, by way of these sensors. For example, objects and/or individual vehicles, which are conveyed in a paced manner by the conveying means, can be counted with this.

The sensor for individual vehicles, for example, can detect as to whether an individual vehicle is paced into the conveying means by the pacing device. Thus, one can ascertain as to whether an individual vehicle is assigned to a certain pace. One can ascertain as to whether an individual vehicle is assigned to a pace and/or whether gaps exist between the paces with individual vehicles. A gap exists if paces without individual vehicles are located between the paces with individual vehicles. The sensor for the conveying means, for example, can detect whether the conveying means is moved, at which speed the conveying means is moved and/or in which pace the conveying means is situated at a certain location.

With a combination of these two sensors, the gravity conveyor can measure and/or count how many individual vehicles are located in the conveying means, in which pace of the conveying means individual vehicles are situated (individually or in which number) and/or at which location a certain pace of the conveying means is located at a certain point in time. Such an arrangement can thus be used as a counting device. This arrangement can provide data on the capacity utilisation and conveying quantity of the gravity conveyor, of the conveying means and/or of the individual vehicles.

Alternatively, the gravity conveyor can also include only one or more sensors for the conveying means. The gravity conveyor can also include only one or more sensors for individual vehicles. The gravity conveyor can comprise sensors for the conveying means and for individual vehicles at different locations of the gravity conveyor—additionally or alternatively to sensors for the conveying means and/or individual vehicles.

The gravity conveyor can also be designed without sensors.

As an optional feature of the gravity conveyor, the pacing device—given an impulse acting upon the pacing device—can engage on individual vehicle of the gravity conveyor at a first contact location of the individual vehicle, and the conveying means can engage on a second contact location of the individual vehicle, which is different to the first one.

In other words, the pacing device and the conveying means engage at different contact locations of the individual vehicle. In particular, the pacing device and the conveying means engage exclusively at different contact locations of the individual vehicle.

For example, this can be effected at different and in particular at opposed sides of the individual vehicle.

For example, the pacing device, considered in the movement direction of the individual vehicles can engage on a right side of the individual vehicle, and the conveying means considered in the movement direction of the individual vehicle engages on the left side of the individual vehicle (wherein the gravitational direction is directed downwards).

The pacing device and the conveying means can be operated without the danger of colliding with one another by way of such an engagement on the individual vehicle at different contact locations, and the pacing device despite this can be designed in a spatially compact manner with a part of the conveying means.

On the other hand, it is also possible for the pacing device as well as the conveying means to simultaneously engage on an individual vehicle, without the movement paths of the respective device parts crossing, due to the engagement on the individual vehicle at different contact locations.

Alternatively, the pacing device and conveying means can engage on at least one equal contact location on the individual vehicle.

The gravity conveyor can include individual vehicles with lateral contact members, wherein the pacing device—given an impulse acting upon the pacing device—engages on the contact members by way of the pacing device engaging between contact members of consecutive individual vehicles.

Driver lugs, hooks, projections, loops, or other elements can be formed and/or fastened on the individual vehicle as contact members. The contact members include possible contact locations of the individual vehicles for the pacing device and/or for the conveying means.

The pacing device or parts thereof (for example, the release means, arms of the release means or elastic contact zone) at least to a certain extent can be positioned between two contact members of consecutive individual vehicles and engage between the contact members by way of this.

If an individual vehicle finds itself outside a pace of the conveying means, the individual vehicle can then run onto the pacing device by way of its contact member and by way of this can gently weaken its impulse via the damping mechanism of the pacing device.

Alternatively, the pacing device can also engage on the individual vehicle, without parts of the pacing device engaging between the contact members of consecutive individual vehicles.

The pacing device, for example, can engage on the individual vehicle or on contact members of this, transversely to the movement direction of the individual vehicles.

The individual vehicles can also be designed without contact members.

A further aspect of the invention encompasses the release means for a pacing device described above, wherein the release means has an arm that is designed elastically at least in a part-region. Advantages and alternatives as well as optional further features of the release means are already described further above in the context of the pacing device.

A further aspect of the invention encompasses a method for pacing individual vehicles of a gravity conveyor into a conveying means of the gravity conveyor that conveys in a paced manner. This method includes the following steps:
- individual vehicles outside a desired pace of the conveying means run with a contact fit onto a release means, wherein with the running-on of the individual vehicles, an impulse of the individual vehicles is gently weakened,
- the release means releases individual vehicles in time windows, which are assigned to the desired pace of the conveying means, wherein the individual vehicles between the running onto the release means and the release by the release means are driven exclusively by gravitational force and/or by individual vehicles that are subsequent in the movement direction of the individual vehicles,
- the individual vehicles which are released by the release means move from the release means to the conveying means, and thereby the individual vehicles are driven exclusively by gravitational energy and/or by individual vehicles that are subsequent in the movement direction of the individual vehicles.

The running-on of the individual vehicles in particular can lead to a congestion formation of individual vehicles in front of the release means. This is also indicated as buffer formation. As already described further above, by way of the running of an individual vehicle onto a buffer or onto congestion, an impulse of the running-on individual vehicle is transferred further through the buffer or congestion onto the frontmost individual vehicle in the movement direction of the individual vehicles. The frontmost individual vehicle then interacts with the release means and the impulse is gently weakened by the damping mechanism.

The release means merely holds back the individual vehicles in this method. The individual vehicles are paced into the conveying means by way of a release of the individual vehicles by the release means. The paced-in individual vehicles are not pushed or actively conveyed by the release means, but in contrast their impulse when required is only gently weakened. The energy, which is necessary for conveying and moving the individual vehicle, is provided by gravitation. A pacing-in which is energy-efficient and/or gentle on the material can be achieved in this manner, wherein moreover all further advantages of the gentle weakening which are mentioned above, as well as of the other features are present.

The features of the method claims analogously can be combined with the device claims and vice versa.

BRIEF DESCRIPTION OF THE DRAWINGS

The subject-matter of the invention is hereinafter described in more detail by way of a preferred embodiment example which is represented in the accompanying drawings. In each case are shown schematically in:

FIG. 7 is a perspective view of a further embodiment of a gravity conveyor.

DETAILED DESCRIPTION OF THE INVENTION

Figure 1:
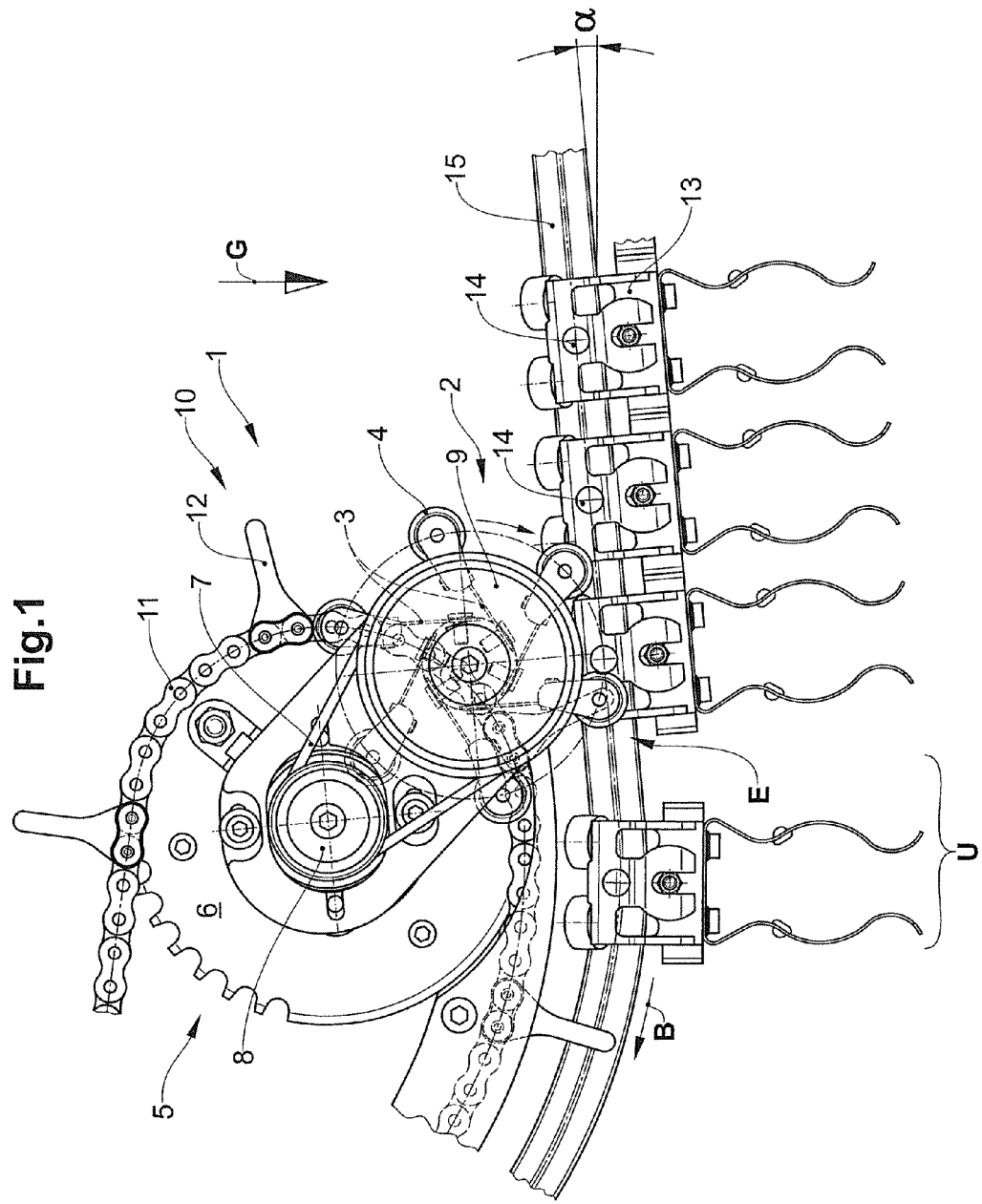
FIG. 1 is a lateral view of a detail of a gravity conveyor with a pacing device, individual vehicles and conveying means.

Basically, the same parts are provided with the same reference numerals in the figures. In some cases, details which differ from the following description are represented in the figures due to reasons regarding technical drawing. Thereby, it is explicitly the case of the facts described in the following description of the figures. Inasmuch as this is concerned, should the circumstances or facts represented in the figures differ from the description, then the circumstances represented in the figures thus do not apply.

For example, not all teeth of cogs are represented in the FIGS. 1 and 4-7 (e.g., of a conveying means wheel 6), although the cogs of course are toothed over their whole periphery. Drivers 12 are also not represented distributed in a correct manner along a chain 11 in FIGS. 1, 6 and 7: the drivers 12 are arranged on the chain 11 at a distance which amounts to a roughly a third of the outer periphery of the conveying means wheel 6, as described in the description further below. The distances of the drivers 12 on the chain 11 in FIGS. 1, 6 and 7 do not correspond to the effective distances according to the description, for reasons of a simpler representation and improved overview.

A detail of a gravity conveyor with a pacing device 1, individual vehicles 13 and conveying means 10 is represented in FIG. 1. FIG. 1 thereby shows a lateral view of the detail. The gravity conveyor includes a rail 15, along which the individual vehicles 13 are conveyed. The rail 15 has an angle α to a horizontal (which is perpendicular to the gravitational direction G), which is 5 degrees. The individual vehicles 13 are driven by this inclination and by the gravitational force acting upon the individual vehicles 13, and are moved through a part-stretch of the gravity conveyor, in which they can come into a contact fit with the pacing device 1.

The individual vehicles 13 are connected to the rail 15 with a contact fit via rollers. The individual vehicles 13 in particular are always connected with a contact fit to the rail 15 via rollers. The individual vehicles 13 in the gravity conveyor are mainly driven by gravity, but on certain part-stretches are also driven by a conveying means 10. The conveying means 10 in these part-stretches are designed and arranged relative to the rail 15 such that it can drive the individual vehicles 13 along the rail 15. For this, the individual vehicles 13 have contact members 14 in the form of driver cams or lugs, which are fastened laterally in the movement direction B of the individual vehicles 13. The contact members 14 thus project from the individual vehicles 13 transversely to the movement direction B of the individual vehicles 13.

The conveying means 10 includes a chain 11. Drivers (catches) 12 are fastened on chain links of the chain 11 at regular distances. The drivers 12 have a pin-like or fingerlike shape and extend away from the chain 11 in the distal direction. The drivers 12 can move the individual vehicles 13 along the rail 15 in the movement direction B of the individual vehicles 13 by way of a contact fit with the contact members 14. This, in particular, is utilized in order to convey the individual vehicles 13 at least partly counter to the gravitation. In FIG. 1, the conveying means 10 moves the individual vehicles 13 thus in a direction with a component counter to the gravitational direction G. The individual vehicles 13, for example, are transported counter to the gravitational direction G by way of this, in order thereafter to drive them again along the gravity conveyor by way of gravitation.

Four individual vehicles 13 are represented in FIG. 1, wherein the individual vehicle 13 that lies furthest downstream in the movement direction B of the individual vehicles 13 has already passed the pacing device 1. This individual vehicle 13 has already been released by the release means 2 and can move along the rail 15 in a manner driven by gravitation, until it is conveyed further by the driver 12 of the conveying means 10 by way of a contact fit with the contact member 14. The three other individual vehicles 13 in FIG. 1 form a buffer and are accumulated by the release means 2 by way of the one of these three individual vehicles 13 lying furthest downstream in the movement direction B of the individual vehicles 13, being in contact fit with the elastic contact zones 4 of the release means 2 and the individual vehicles 13 lying upstream running thereon or having run thereon.

A spatial position, in which the last possible contact fit between the individual vehicles 13 and pacing device 1 can be effected on passing the pacing device 1 in the movement direction B of the individual vehicles 13 of the gravity conveyor is indicated as the release position E and is drawn in FIG. 1. A transfer location U is likewise drawn, and this indicates a spatial position of the individual vehicles 13, in which an individual vehicle 13 can be taken over by the conveying means 10 conveying in a paced manner. The take-over or transfer location U thereby lies downstream of the release position E in the movement direction of the individual vehicles 13 and lies further to the bottom considered in the gravitational direction G. Thus, the individual vehicles can be driven from the release location E to the take-over location U in a manner driven by gravitation.

The pacing device 1 paces the individual vehicles 13 into the conveying means 10. The pacing device includes a drive mechanism 5 and a release means 2. The drive mechanism 5 includes a conveying means wheel 6, a transmission 8, a toothed belt 7 and a drive disc 9. The drive disc 9 in FIG. 1 covers a large part of the release means 2 lying therebehind. The conveying means wheel 6 is designed a toothed wheel or cog, which engages into the chain 11 of the conveying means 10 and deflects this. After the deflection by the conveying means wheel 6, the chain 11 runs in the movement direction B of the individual vehicles 13 along the rail 15 for a part-stretch of the gravity conveyor. The conveying means 10 can move or convey the individual vehicles 13 along this part-stretch.

The conveying means wheel 6 rotates together with the conveying means 10 and transmits its movement and energy by way of the transmission 8 and the toothed belt 7 onto the drive disc 9. The transmission 8 includes a toothed belt wheel which is arranged concentrically to the conveying means wheel 6 and is rigidly connected thereto and is with an outer periphery that is different to the conveying means wheel 6 (by which means a ratio of the transmission is fixed). The toothed belt 7 non-positively connects the toothed belt wheel of the transmission 8 and the drive disc 9, and by way of this transfers the movement and energy of the conveying means 10 onto the drive disc 9. The drive disc 9 in turn is rigidly connected to the release means 2 and by way of this transfers the movement and energy of the conveying means 10 onto the release means 2, which are thus rigidly connected to one another.

Figure 2:
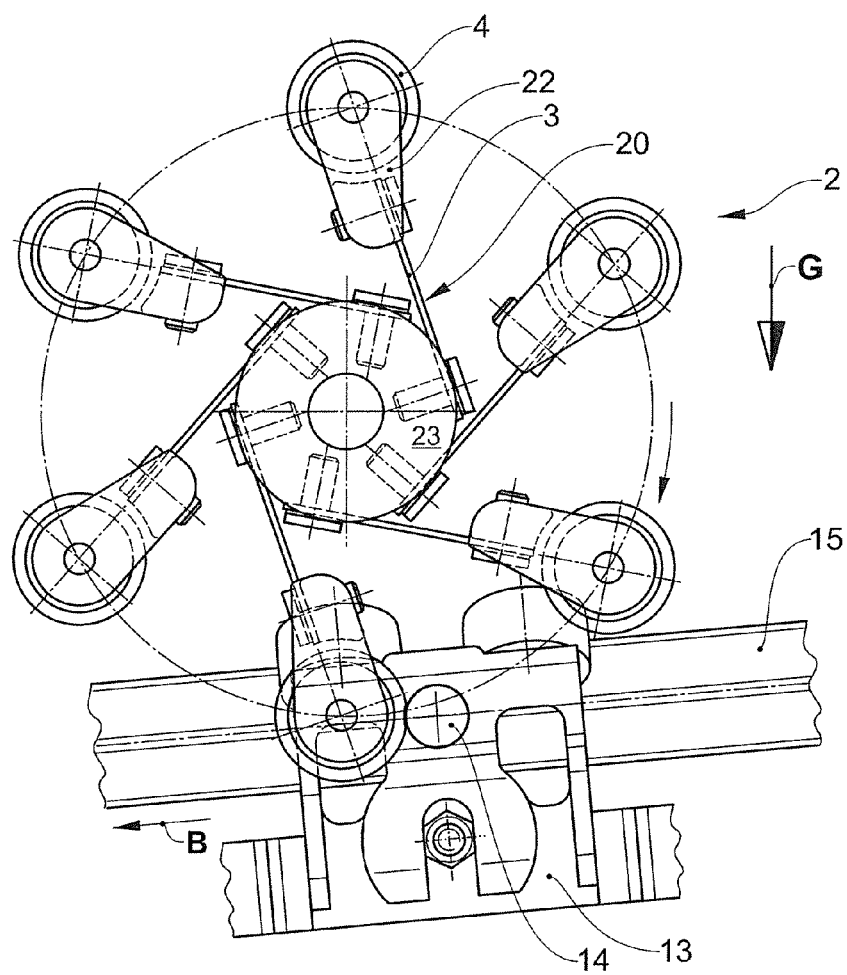
FIG. 2 is a lateral view of a release means of the pacing device from FIG. 1.

The release means 2 of FIG. 1 is represented in FIG. 2 in a lateral view, separately from the pacing device 1 and without a drive mechanism 5. The pacing device 1 includes a wheel-like release means 2, which here has six arms 3. The arms 3 thereby are uniformly distributed on the periphery of the wheel-like release means 2 and have elastic contact zones 4. The elastic contact zones 4 are encompassed by surfaces of O-rings of elastic plastic. These elastic contact zones 4 can come into a contact fit with the individual vehicles 13 or their contact members 14, by way of the arms 3 at least partly engaging between the contact members 14 of two individual vehicles 13, which are consecutive to one another, as is illustrated in FIG. 3, for example.

The arms 3 comprise an elastic region 20 which consists of spring-steel sheet. A bush holder 22 is fastened on an outer end of the elastic region 20 of the arm 3, said end being situated distally with respect to the release means 2. The bush holder 22 holds a freely rotatably mounted bush 21. Two grooves, in which two O-rings of elastic plastic are arranged and which are peripheral around the outer periphery are formed on an outer periphery of the bush 21. The O-rings have an inner diameter that is smaller than the outer periphery of the bush 21 within the peripheral grooves, by which means the O-rings are slightly stretched and are fastened in the groove and on the bush 21 by way of this. The elastic region 20 as well as the O-rings are a constituent of the damping mechanism, which is formed on the arm 3 and which gently weakens the impulse of the individual vehicles 13 that acts upon the pacing device 1.

The arm 3 is fastened on an inner end of the elastic region 20, which lies opposite the outer end, by way of screwing on an outer side of a disc-like base body 23 of the release means 2. Thereby, the arms 3 extend essentially in one direction and tangentially away from the base body 23. The arms 3 are arranged on the base body 23 in a manner such that the outer ends of the arms 3 move away from the base body 23 with an impulse acting from individual vehicles 13 upon the arms 3. The base body 23 is connected to the drive disc 9 (not shown in FIG. 2) in a rigid and non-positive manner. The O-rings form the elastic contact zones 4 of the arms 3 and are arranged on the outer, distal edge of the release means 2.

Figure 3:
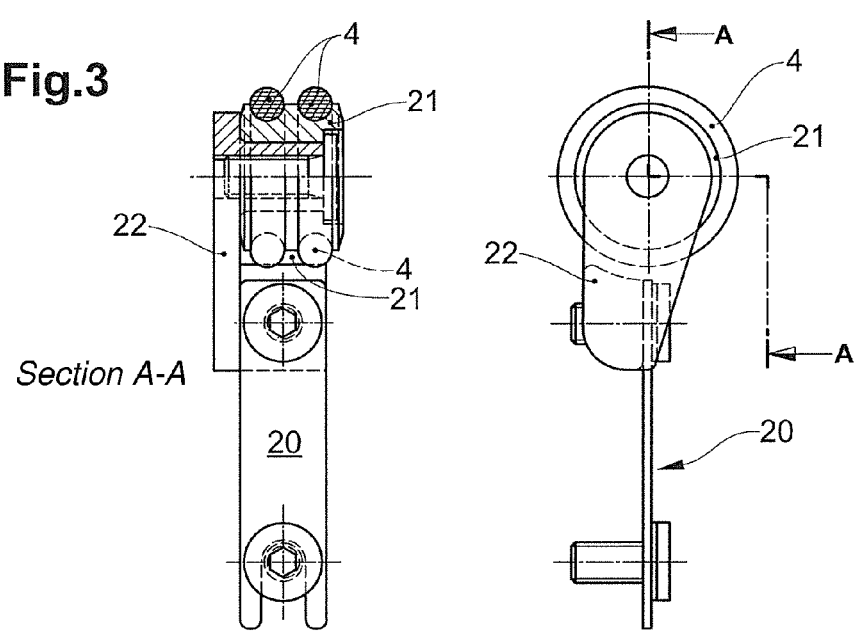
FIG. 3 provides a front and lateral view of an arm of the release means from FIG. 2.

FIG. 3 in each case shows a front view and a lateral view of an arm 3 of the release means 1 of FIG. 2. The front view thereby follows the section A-A which is drawn in the lateral view. The elastic region 20 is formed from spring-steel sheet, and a bush holder 22 is fastened at its outer end. Likewise shown is the bush 21 which is freely rotatably mounted in the bush holder 21 by way of a screw and is with the peripheral grooves and the O-rings located therein. These O-rings form the elastic contact zones 4.

Figure 4:
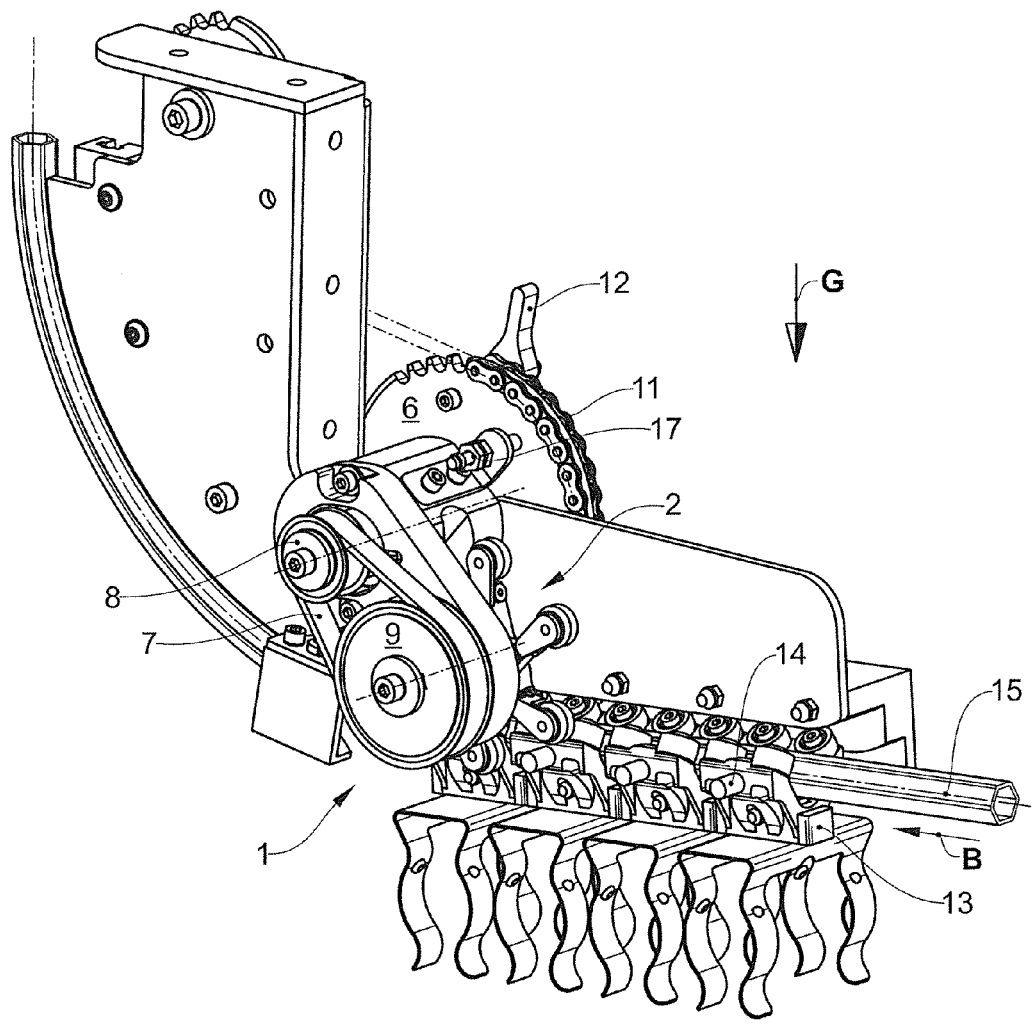
FIG. 4 is a perspective view of a part of the gravity conveyor from FIG. 1.

A perspective view of a part of the gravity conveyor of FIG. 1 is represented in FIG. 4. Thereby, it is well evident that the release means 2 engages on the individual vehicle 13 on a side of this individual vehicle, which is on the left considered in a movement direction B of the individual vehicles 13 (wherein the gravitational direction points downwards). This engagement is effected by way of the arms 3 of the release means 2 engaging between contact members 14 of two consecutive individual vehicles 13. The drivers or catches 12 of the conveying means 10, in contrast, engage on the individual vehicle 13 at the right side, which is opposite to the left side. The drivers 12 also engage between contact members 14 of two consecutive individual vehicles 13. The drivers 12, however, engage on different contact members 14 of the individual vehicles 13 than do the arms 3 of the pacing device 1. The drivers 12 and the arms 3 of the pacing device 1 thus do not mechanically interfere with one another by way of this.

A sensor 17 of the conveying means 10 can be well recognised in FIG. 4. The sensor 17 is designed as an induction sensor and detects screw heads, which are moved past the sensor 17 and which are fastened on the conveying means wheel 6. In the present case, the conveying means wheel 6 comprises three screw heads which are uniformly distributed on a circulating path of the conveying means wheel 6 (offset by 120 degrees to one another). Each screw head thereby is arranged relative to the conveying means 10 in a manner such that the screw heads are positioned in each case in a region between the drivers 12 fastened on the chain 11, and a rotation pivot of the conveying means wheel 6. In other words, the screw heads on the conveying means wheel 6 mark the drivers 12 which, at this instant, are situated on the conveying means wheel 6. The drivers 12 are moreover arranged on the chain 11 at a distance that is roughly a third of an outer periphery of the conveying means wheel 6.

The sensor 17 of the conveying means 10 thus inductively detects as to whether and at what speed the conveying means wheel 6 rotates and as a result as to whether and at what speed the conveying means 10 moves. The sensor 17 for the conveying means 10, by way of a suitable number and arrangement of the screw heads also permits the deduction as to whether and at what speed the drivers 12 move and/or where the drivers 10 are located.

Figure 5:
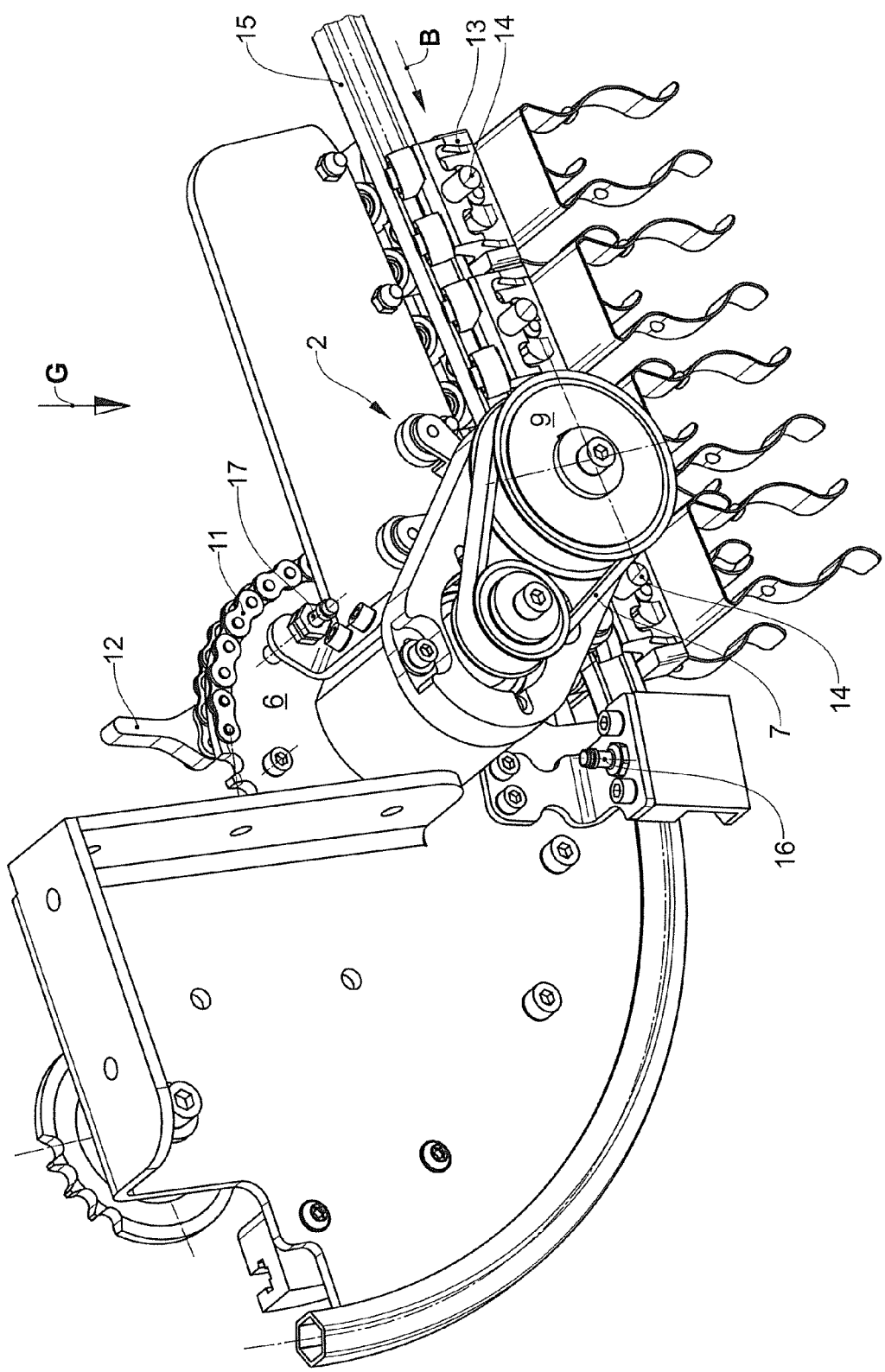
FIG. 5 a perspective view of the gravity conveyor from FIG. 4 with a slightly displaced viewing point.

FIG. 5 also shows a perspective view of the gravity conveyor of FIG. 4, however with a slightly relocated viewing angle (but still from the same side as in FIG. 4). A sensor 16 for individual vehicles 13 is well recognisable from this. The sensor 16 for the individual vehicles 13 is also designed as an induction sensor. The sensor 16 for individual vehicles 13 is positioned connecting to the pacing device 1 downstream in the movement direction B of the individual vehicles 13 and inductively detects contact members 14 of individual vehicles 13 which are moved past the sensor 16. The sensor 16, by way of this, thus detects as to whether an individual vehicle 13 has run through and left the pacing device 1. The sensor 16 for individual vehicles 13 can thus count the individual vehicles 13 that have passed the pacing device 1.

Thus one can unambiguously deduce as to whether a driver 12 catches one or more individual vehicles 13 or whether one or more individual vehicles 13 are assigned to a pace, to which a driver 12 is assigned, by way of a combination of the information from the sensor 17 for the conveying means 10 and the information from the sensor 16 for the individual vehicles 13.

Figure 6:
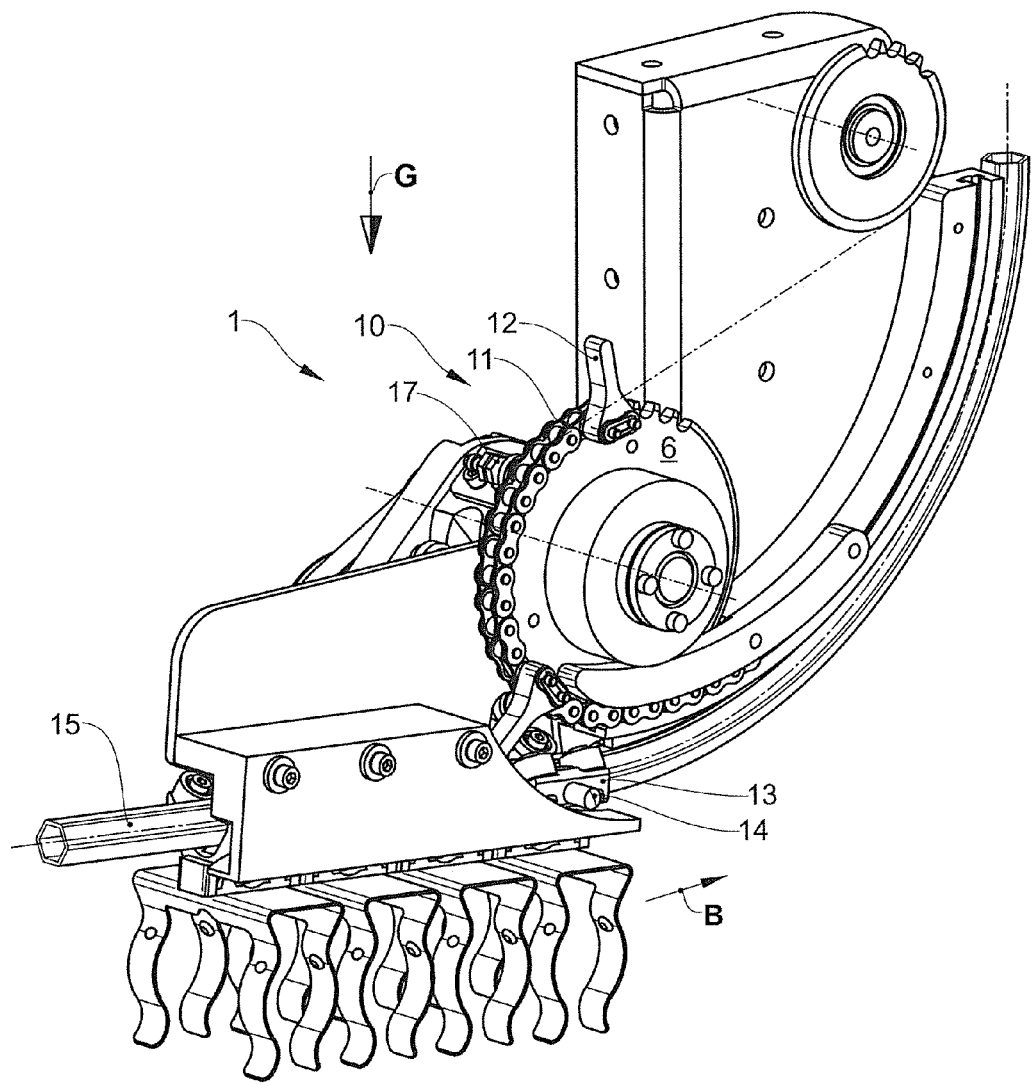
FIG. 6 is a perspective view of another side of the gravity conveyor from FIG. 4.

FIG. 6 shows a perspective view of another side of the gravity conveyor of FIG. 4. On this side, the drivers 12 of the conveying means 10 engage between the contact members 14 of the individual vehicles 13, in order to move them further along the rail 15. The chain 11 in the movement direction B of the individual vehicles 13 is led downstream of the conveying means wheel 6 by way of a guide mechanism, in a manner such that the conveying means 10 runs along the rail 15 and can convey the individual vehicles 13 by way of this.

A detail of a gravity conveyor is shown in FIG. 7 and this gravity conveyor is designed analogously to the gravity conveyor in FIG. 1 as well as FIGS. 4 to 6, with the pacing device 1, the individual vehicles 13 and the conveying means 10. In contrast thereto, the conveying means 10 however (downstream of the pacing device 1 in the movement direction B of the individual vehicles 13) conveys the individual vehicles 13 at least partly in the gravitational direction. The conveying means 10 in FIG. 7 thus moves the individual vehicles 13 in a direction with a component in the gravitational direction G. This has the effect that the individual vehicles 13 lie on the drivers 12 of the chain 11 and are braked and paced by the drivers 12.

The invention claimed is:

1. A pacing device for a transfer of individual vehicles of a gravity conveyor onto a conveying device of the gravity conveyor that conveys in a paced manner, wherein the pacing device is designed such that the individual vehicles can be assigned to a pace of the conveying device, wherein the pacing device comprises a drive mechanism and a damping mechanism, said damping mechanism weakens an impulse of each individual vehicle acting upon the pacing device, the impulse being weakened in an extended manner over a time period of at least 0.05 seconds;
wherein the pacing device comprises a singularizing device including a release, said release, via a contact fit with the individual vehicles, paces the individual vehicles into the conveying device, said damping mechanism being formed on the release,
wherein the singularizing device effects a singularization of the individual vehicles on pacing into the conveying device.

2. The pacing device according to claim 1, wherein the damping mechanism comprises an arm, and wherein at least a portion of the arm is elastic.

3. The pacing device according to claim 1, wherein the damping mechanism comprises an elastic contact zone for a contact fit with the individual vehicles.

4. The pacing device according to claim 1, wherein the pacing device comprises a pivot, about which the release is rotatably mounted, wherein the pivot is arranged running through a mass center point of the release.

5. The pacing device according to claim 1, wherein the drive mechanism is driven by the conveying device.

6. The pacing device according to claim 5, wherein the drive mechanism rigidly couples the release onto the conveying device.

7. The pacing device according to claim 1, wherein the pacing device is designed and positioned such that a release position relative to the gravitational direction is arranged above the transfer location to the conveying device, wherein the release position indicates a spatial position of the individual vehicles, in which the last possible contact fit between the individual vehicles and the pacing device can be effected on passing the pacing device in the movement direction of the individual vehicles.

8. The pacing device according to claim 1, wherein the conveying device comprises a chain with drivers.

9. The pacing device according to claim 1, wherein the gravity conveyor comprises a sensor for individual vehicles, and a sensor for the conveying device.

10. The pacing device according to claim 1, wherein the pacing device, given an impulse acting upon the pacing device, engages on an individual vehicle of the gravity conveyor at a first contact location of the individual vehicle, and the conveying device engages on a second contact location of the individual vehicle that is different from the first contact location.

11. The pacing device according to claim 1, wherein the gravity conveyor comprises individual vehicles with lateral contact members, wherein the pacing device, given an impulse acting upon the pacing device, engages on the contact members by way of the pacing device engaging between contact members of consecutive individual vehicles.

12. A pacing device for a transfer of individual vehicles of a gravity conveyor onto a conveying device of the gravity conveyor that conveys in a paced manner, wherein the pacing device is designed such that the individual vehicles can be assigned to a pace of the conveying device, wherein the pacing device comprises a drive mechanism and a damping mechanism, said damping mechanism gradually weakens an impulse of each individual vehicle acting upon the pacing device;

wherein the pacing device comprises singularizing device including a release, said release, via a contact fit with the individual vehicles, paces the individual vehicles into the conveying device, said damping mechanism being formed on the release;

wherein the singularizing device that effects a singularization of the individual vehicles on pacing into the conveying device;

and wherein the release comprises an arm, and wherein at least a portion of the arm is elastic.

13. A method for pacing individual vehicles of a gravity conveyor into a conveying device of the gravity conveyor that conveys in a paced manner, comprising the steps of:

directing individual vehicles that are outside a desired pace of the conveying device with a contact fit onto a release, weakening an impulse of the individual vehicles in an extended manner over a time period of at least 0.05 seconds in a running-on of the individual vehicles, releasing, via the release, individual vehicles in time windows, which are assigned to the desired pace of the conveying device, driving the individual vehicles, between the running onto the release and the release by the release, exclusively by gravitational force and/or by individual vehicles that are subsequent in a movement direction of the individual vehicles, and, moving the individual vehicles that are released by the release from the release to the conveying device, and thereby driving the individual vehicles exclusively by gravitational energy and/or by individual vehicles that are subsequent in the movement direction of the individual vehicles.

\* \* \* \* \*